(12) United States Patent
Carroll

(10) Patent No.: US 10,768,951 B2
(45) Date of Patent: Sep. 8, 2020

(54) PROVIDING AUGMENTED REALITY USER INTERFACES AND CONTROLLING AUTOMATED SYSTEMS BASED ON USER ACTIVITY INFORMATION AND PRE-STAGING INFORMATION

(71) Applicant: Bank of America Corporation, Charlotte, NC (US)

(72) Inventor: Matthew E. Carroll, Charlotte, NC (US)

(73) Assignee: Bank of America Corporation, Charlotte, NC (US)

(*) Notice: Subject to any disclaimer, the term of this patent is extended or adjusted under 35 U.S.C. 154(b) by 101 days.

(21) Appl. No.: 16/115,752

(22) Filed: Aug. 29, 2018

(65) Prior Publication Data
US 2020/0073681 A1    Mar. 5, 2020

(51) Int. Cl.
| | |
|---|---|
| G06F 9/451 | (2018.01) |
| G06T 19/00 | (2011.01) |
| G06F 3/0484 | (2013.01) |
| H04L 29/06 | (2006.01) |
| G06F 3/0482 | (2013.01) |

(52) U.S. Cl.
CPC ............ *G06F 9/451* (2018.02); *G06F 3/0484* (2013.01); *G06T 19/006* (2013.01); *G06F 3/0482* (2013.01); *H04L 67/42* (2013.01)

(58) Field of Classification Search
None
See application file for complete search history.

(56) References Cited

U.S. PATENT DOCUMENTS

| | | | |
|---|---|---|---|
| 6,083,270 | A | 7/2000 | Scott |
| 6,945,457 | B1 | 9/2005 | Barcelou |
| 7,305,691 | B2 | 12/2007 | Cristofalo |
| 9,547,960 | B2 | 1/2017 | Thomas et al. |
| 9,792,594 | B1 | 10/2017 | Bayha et al. |

(Continued)

OTHER PUBLICATIONS

Author: Gearsofbiz, Title: Southwest Airlines Android app review, source: https://www.youtube.com/watch?v=W2B9epjUlbE, date: Dec. 16, 2010; pp. 4 (Year: 2010).*

*Primary Examiner* — Jwalant Amin
(74) *Attorney, Agent, or Firm* — Banner & Witcoff, Ltd.; Michael A. Springs

(57) ABSTRACT

Aspects of the disclosure relate to providing augmented reality user interfaces and controlling automated systems based on user activity information and pre-staging information. A computing platform may receive, from a client user device, a trip start notification indicating that a user of the client user device is initiating a trip to an enterprise center. In response to receiving the trip start notification, the computing platform may generate a pre-staging augmented reality user interface for a client augmented reality device linked to the client user device. Thereafter, the computing platform may receive pre-staging information identifying one or more events to be performed at the enterprise center when the user of the client user device arrives at the enterprise center. The computing platform may generate one or more pre-staging commands based on the pre-staging information and may send these commands to one or more systems associated with the enterprise center.

20 Claims, 10 Drawing Sheets

(56) References Cited

U.S. PATENT DOCUMENTS

| | | |
|---|---|---|
| 2013/0293580 A1* | 11/2013 | Spivack ............ G06Q 30/0643 345/633 |
| 2017/0032131 A1 | 2/2017 | Dow et al. |
| 2017/0032573 A1 | 2/2017 | Dow et al. |
| 2017/0053245 A1 | 2/2017 | Moretti et al. |
| 2017/0054702 A1 | 2/2017 | Turgeman |
| 2017/0054735 A1 | 2/2017 | Moretti et al. |
| 2017/0061438 A1 | 3/2017 | Patel |
| 2017/0076089 A1 | 3/2017 | Turgeman |
| 2017/0085587 A1 | 3/2017 | Turgeman |
| 2017/0091450 A1 | 3/2017 | Turgeman |
| 2017/0116784 A1 | 4/2017 | Hintermeister et al. |
| 2017/0126735 A1 | 5/2017 | Turgeman |
| 2017/0140279 A1 | 5/2017 | Turgeman |
| 2017/0154366 A1 | 6/2017 | Turgeman |
| 2017/0193526 A1 | 7/2017 | Turgeman et al. |
| 2017/0195356 A1 | 7/2017 | Turgeman et al. |
| 2017/0200162 A1 | 7/2017 | Pourfallah et al. |
| 2017/0206572 A1 | 7/2017 | Hanson et al. |
| 2017/0221064 A1 | 8/2017 | Turgeman et al. |
| 2017/0228704 A1 | 8/2017 | Zhou et al. |
| 2017/0230792 A1* | 8/2017 | Shaik ................. G06F 3/04842 |
| 2017/0243199 A1 | 8/2017 | Kalgi |
| 2017/0300911 A1 | 10/2017 | Alnajem |
| 2017/0324726 A1 | 11/2017 | Alleaume et al. |
| 2017/0346851 A1 | 11/2017 | Drake |
| 2017/0351848 A1 | 12/2017 | Bakish |
| 2018/0025334 A1 | 1/2018 | Pourfallah et al. |
| 2018/0034850 A1 | 2/2018 | Turgeman |
| 2018/0038706 A1 | 2/2018 | Ellenby et al. |
| 2018/0046948 A1 | 2/2018 | Ray et al. |
| 2018/0095596 A1 | 4/2018 | Turgeman |
| 2018/0102018 A1 | 4/2018 | Cage et al. |
| 2018/0103047 A1 | 4/2018 | Turgeman et al. |
| 2018/0107816 A1 | 4/2018 | Wu et al. |
| 2018/0114127 A1 | 4/2018 | Cole et al. |
| 2018/0115899 A1 | 4/2018 | Kedem et al. |
| 2018/0121640 A1 | 5/2018 | Turgeman |
| 2018/0144112 A1 | 5/2018 | Pitel et al. |
| 2018/0150812 A1 | 5/2018 | Kurian et al. |
| 2018/0152835 A1 | 5/2018 | Kurian et al. |
| 2018/0157336 A1 | 6/2018 | Harris et al. |
| 2018/0158036 A1 | 6/2018 | Zhou et al. |
| 2018/0159852 A1 | 6/2018 | Crabtree et al. |
| 2018/0160309 A1 | 6/2018 | Turgeman et al. |
| 2018/0165921 A1 | 6/2018 | Kurian et al. |
| 2018/0176272 A1 | 6/2018 | Zur et al. |
| 2018/0189665 A1 | 7/2018 | Zhang et al. |
| 2018/0203662 A1 | 7/2018 | Liu |
| 2018/0216946 A1 | 8/2018 | Gueye |
| 2018/0219824 A1 | 8/2018 | Laller |
| 2018/0232511 A1 | 8/2018 | Bakish |
| 2018/0232756 A1 | 8/2018 | Greene et al. |

* cited by examiner

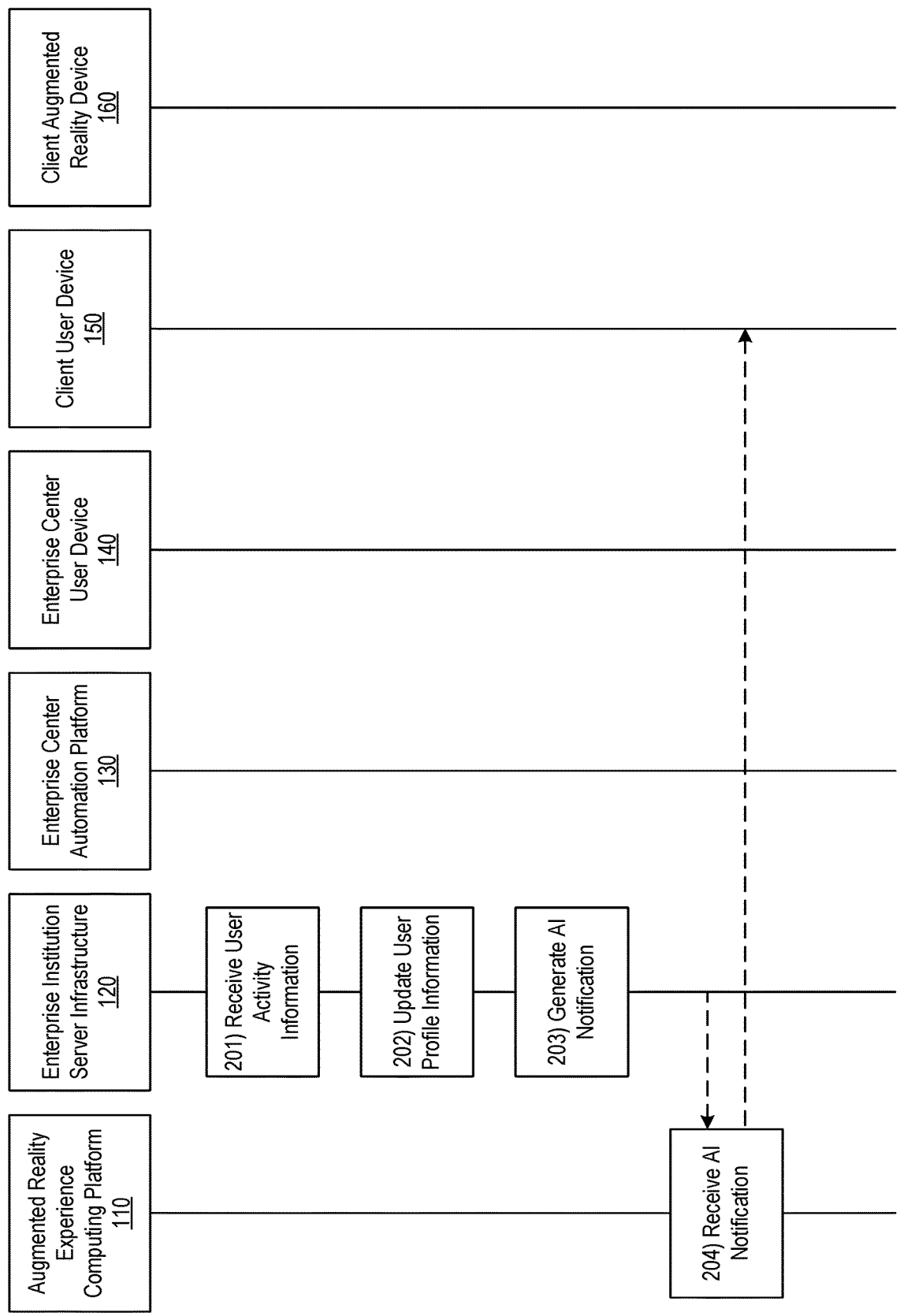

PROVIDING AUGMENTED REALITY USER INTERFACES AND CONTROLLING AUTOMATED SYSTEMS BASED ON USER ACTIVITY INFORMATION AND PRE-STAGING INFORMATION

BACKGROUND

Aspects of the disclosure relate to data processing, augmented reality interfaces and devices, and control systems. In particular, one or more aspects of the disclosure relate to providing augmented reality user interfaces and controlling automated systems based on user activity information and pre-staging information.

Organizations increasingly provide electronic portals, mobile applications, and other electronic tools via which various users may access, view, and/or modify information, including client information. Increasing the functionality available via such electronic tools while also ensuring the safety and security of information maintained by organization systems and/or made available via such tools is increasingly important. In many instances, however, it may be difficult to optimize for increased functionality, information security, and efficient and effective technical operations of the computer systems that maintain such information and/or support such electronic tools.

SUMMARY

Aspects of the disclosure provide effective, efficient, scalable, and convenient technical solutions that address and overcome the technical problems associated with deploying and maintaining electronic portals, mobile applications, and other electronic tools by providing augmented reality user interfaces and controlling automated systems based on user activity information and pre-staging information.

In accordance with one or more embodiments, a computing platform having at least one processor, a communication interface, and memory may receive, via the communication interface, from a client user device, a trip start notification indicating that a user of the client user device is initiating a trip to an enterprise center. In response to receiving the trip start notification from the client user device, the computing platform may generate a pre-staging augmented reality user interface for a client augmented reality device linked to the client user device. Subsequently, the computing platform may send, via the communication interface, to the client augmented reality device linked to the client user device, the pre-staging augmented reality user interface generated for the client augmented reality device linked to the client user device. In addition, sending the pre-staging augmented reality user interface generated for the client augmented reality device linked to the client user device may cause the client augmented reality device linked to the client user device to display the pre-staging augmented reality user interface and prompt the user of the client user device to provide pre-staging input. Thereafter, the computing platform may receive, via the communication interface, from the client augmented reality device linked to the client user device, pre-staging information identifying one or more events to be performed at the enterprise center when the user of the client user device arrives at the enterprise center. The computing platform may generate one or more pre-staging commands based on the pre-staging information identifying the one or more events to be performed at the enterprise center. Then, the computing platform may send, via the communication interface, to one or more systems associated with the enterprise center, the one or more pre-staging commands generated based on the pre-staging information identifying the one or more events to be performed at the enterprise center.

In some embodiments, prior to receiving the trip start notification from the client user device, the computing platform may receive, via the communication interface, from enterprise institution server infrastructure, a notification generated by an artificial-intelligence engine executing on the enterprise institution server infrastructure, and the notification may identify at least one predicted event for the user of the client user device. Subsequently, the computing platform may send, via the communication interface, to the client user device, the notification received from the enterprise institution server infrastructure.

In some embodiments, receiving the trip start notification from the client user device may include receiving information indicating an estimated time of arrival determined by an autonomous vehicle being used by the user of the client user device to travel to the enterprise center. In some embodiments, receiving the trip start notification from the client user device may include receiving information indicating an estimated time of arrival determined by a ride sharing application associated with a ride sharing service being used by the user of the client user device to travel to the enterprise center.

In some embodiments, sending the pre-staging augmented reality user interface to the client augmented reality device linked to the client user device may include sending the pre-staging augmented reality user interface to an augmented reality headset linked to the client user device. In some embodiments, sending the pre-staging augmented reality user interface to the client augmented reality device linked to the client user device may include sending the pre-staging augmented reality user interface to an augmented reality windshield display system linked to the client user device.

In some embodiments, receiving the pre-staging information identifying the one or more events to be performed at the enterprise center may include receiving information identifying a request to pick up at least one physical item at the enterprise center. In some embodiments, receiving the pre-staging information identifying the one or more events to be performed at the enterprise center may include receiving information identifying a request to drop off at least one physical item at the enterprise center. In some embodiments, receiving the pre-staging information identifying the one or more events to be performed at the enterprise center may include receiving information identifying a request for a specific encounter at the enterprise center.

In some embodiments, sending the one or more pre-staging commands to the one or more systems associated with the enterprise center may include sending at least one command directing an enterprise center automation platform associated with the enterprise center to execute one or more automated physical item loading actions. In some embodiments, sending the one or more pre-staging commands to the one or more systems associated with the enterprise center may include sending at least one command directing an enterprise center user device to present a notification instructing a user of the enterprise center user device to perform one or more manual physical item loading actions.

In some embodiments, after sending the one or more pre-staging commands to the one or more systems associated with the enterprise center, the computing platform may generate a navigation augmented reality user interface for the client augmented reality device linked to the client user device. Subsequently, the computing platform may send, via the communication interface, to the client augmented reality device linked to the client user device, the navigation augmented reality user interface generated for the client augmented reality device linked to the client user device.

In some embodiments, the computing platform may receive, via the communication interface, from the client user device, a trip arrival notification indicating that the user of the client user device has completed the trip to the enterprise center. In response to receiving the trip arrival notification from the client user device, the computing platform may generate an arrival-assistance augmented reality user interface for the client augmented reality device linked to the client user device. Subsequently, the computing platform may send, via the communication interface, to the client augmented reality device linked to the client user device, the arrival-assistance augmented reality user interface generated for the client augmented reality device linked to the client user device. In addition, sending the arrival-assistance augmented reality user interface generated for the client augmented reality device linked to the client user device may cause the client augmented reality device linked to the client user device to display the arrival-assistance augmented reality user interface and notify the user of the client user device of one or more locations at the enterprise center to visit to complete the one or more events to be performed at the enterprise center.

In some embodiments, the computing platform may generate a destination activity notification for the client augmented reality device linked to the client user device. In addition, the destination activity notification generated for the client augmented reality device linked to the client user device may include information associated with the one or more events to be performed at the enterprise center. Subsequently, the computing platform may send, via the communication interface, to the client augmented reality device linked to the client user device, the destination activity notification generated for the client augmented reality device linked to the client user device.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2F depict an illustrative event sequence for providing augmented reality user interfaces and controlling automated systems based on user activity information and pre-staging information in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to providing enhanced drive-up banking experiences using augmented reality (AR) technology, such as AR glasses. For example, a customer may be utilizing an autonomous vehicle or a semi-autonomous vehicle. The customer may input a drive-up banking center as a destination, and/or a bank's smart assistant may pre-stage a transaction at the banking center. When the customer arrives at the banking center, they may be authenticated using their banking card, vehicle, and/or registered AR device as known authentication factors. Because the transaction is pre-staged, it may be very easy and simple for the customer to authenticate and complete the transaction when they arrive. In some instances, this functionality may be built into an in-vehicle app. In addition, AR aspects may enhance the customer's experience—e.g., by allowing the customer to more easily interact with the teller inside the banking center, receive three-dimensional guidance about where to place deposit items in the remote deposit system, and/or the like.

Figure 1A:
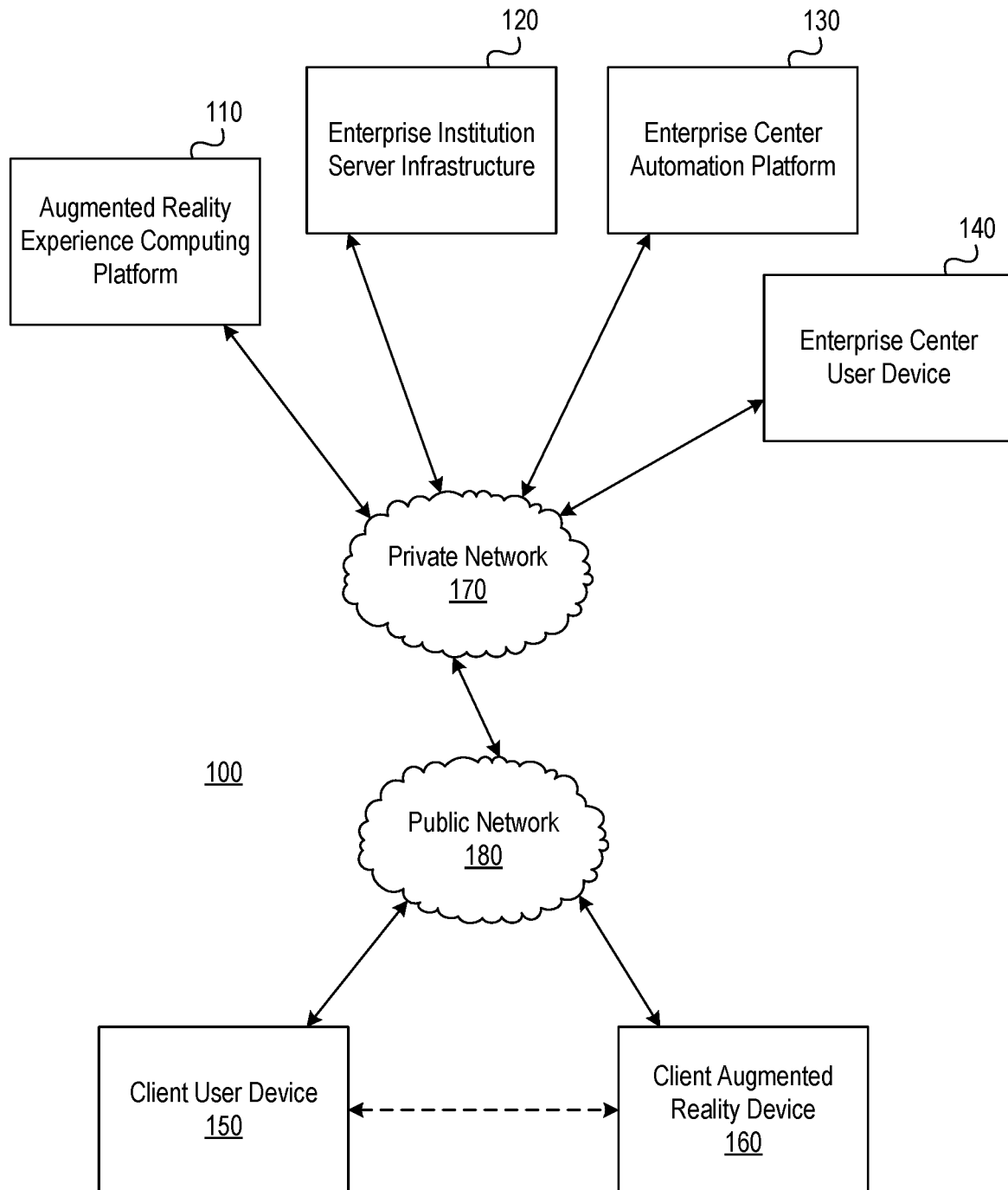
FIGS. 1A and 1B depict an illustrative computing environment for providing augmented reality user interfaces and controlling automated systems based on user activity information and pre-staging information in accordance with one or more example embodiments.
Figure 1B:
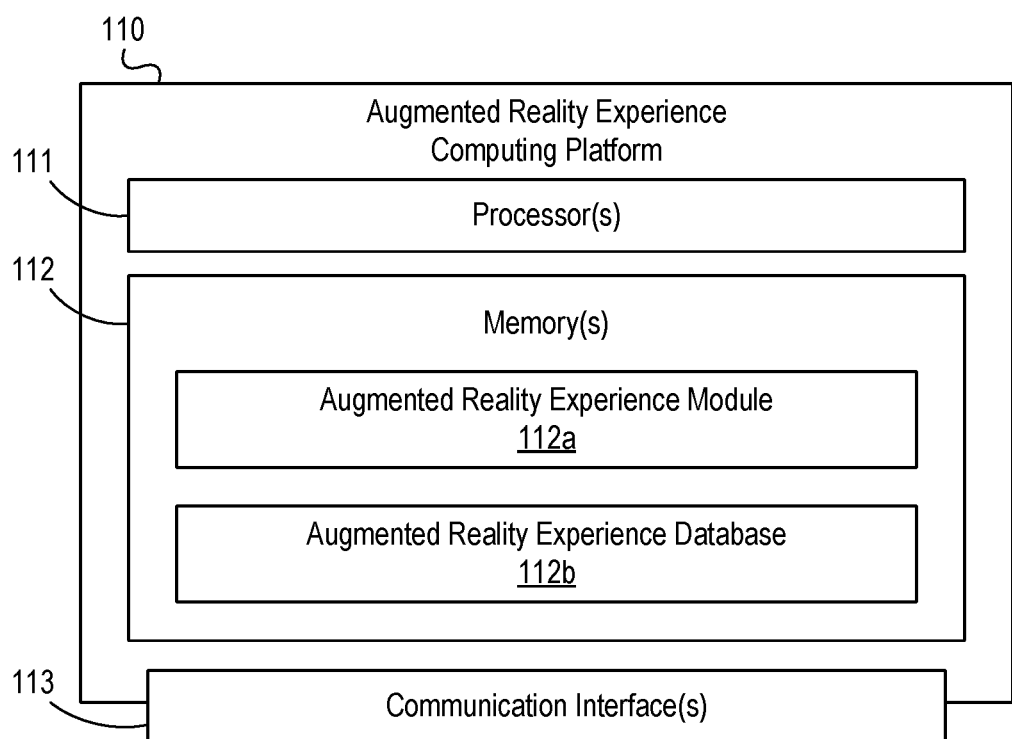

FIGS. 1A and 1B depict an illustrative computing environment for providing augmented reality user interfaces and controlling automated systems based on user activity information and pre-staging information in accordance with one or more example embodiments. Referring to FIG. 1A, computing environment 100 may include one or more computer systems. For example, computing environment 100 may include an augmented reality experience computing platform 110, enterprise institution server infrastructure 120, an enterprise center automation platform 130, an enterprise center user device 140, a client user device 150, and a client augmented reality device 160.

As illustrated in greater detail below, augmented reality experience computing platform 110 may include one or more computing devices configured to perform one or more of the functions described herein. For example, augmented reality experience computing platform 110 may include one or more computers (e.g., laptop computers, desktop computers, servers, server blades, or the like).

Enterprise institution server infrastructure 120 may include a plurality of servers, and each of these servers may include one or more computing devices and/or other computer components (e.g., processors, memories, communication interfaces). In addition, and as illustrated in greater detail below, enterprise institution server infrastructure 120 may be configured to maintain user activity information and user profile information, provide an artificial-intelligence engine that generates notifications (which may, e.g., be associated with user-specific needs and/or be generated based on user activity information and/or user profile information), and/or perform other enterprise functions (which may, e.g., include account management functions, transaction processing functions, and/or other functions). Additionally or alternatively, enterprise institution server infrastructure 120 may be configured to process and/or execute financial events associated with particular accounts, for instance, by updating its own databases, by writing data to other databases, and/or by commanding and/or controlling other systems and/or devices. In some instances, one or more financial events may be or correspond to a transfer of funds from one account to another, a money transfer associated with an estate, a transaction associated with a group or joint account (e.g., an investment club account), an endorsement for a joint account, a contractual agreement, a mortgage loan documentation requirement or transaction, or the like. In some instances, one or more events may be defined via a client portal provided by enterprise institution server infrastructure 120 and/or one or more other systems and/or devices included in computing environment 100. Such a client portal may be hosted by an organization, and may be an online banking portal or a mobile banking portal provided by a financial institution. In addition, such a portal may, for instance, provide customers of the financial institution with access to financial account information (e.g., account balance information, account statements, recent transaction history information, or the like) and/or may provide customers of the financial institution with menus, controls, and/or other options to schedule and/or execute various transactions (e.g., online bill pay transactions, person-to-person funds transfer transactions, or the like).

Enterprise center automation platform 130 may include one or more servers, and each of these servers may include one or more computing devices and/or other computer components (e.g., processors, memories, communication interfaces). In some instances, enterprise center automation platform 130 also may include one or more automation devices (e.g., robotic item sorters, item dispensing systems, item transport systems, item storage systems, electronically controlled lockboxes, and/or the like). In addition, and as illustrated in greater detail below, enterprise center automation platform 130 may be configured to receive and/or process pre-staging commands and/or other commands (e.g., by controlling its robotic item sorters, item dispensing systems, item transport systems, item storage systems, electronically controlled lockboxes, and/or the like to prepare items for pickup, prepare to receive items that will be dropped off, and/or the like). Additionally or alternatively, enterprise center automation platform 130 may be deployed at a specific enterprise center, such as a specific banking center operated by a financial institution.

Enterprise center user device 140 may be a personal computing device (e.g., desktop computer, laptop computer) or mobile computing device (e.g., smartphone, tablet) that may be linked to and/or used by an enterprise user (who may, e.g., be an employee or affiliate of an enterprise organization, such as a financial institution). Additionally or alternatively, enterprise center user device 140 may be deployed at a specific enterprise center, such as a specific banking center operated by a financial institution.

Client user device 150 may be a personal computing device (e.g., desktop computer, laptop computer) or mobile computing device (e.g., smartphone, tablet) that may be linked to and/or used by a client user (who may, e.g., be a customer of an enterprise organization, such as a financial institution). Client augmented reality device 160 may be an augmented reality computing device and/or display device that may be linked to and/or connected to client user device 150 (e.g., via a wired connection and/or via a wireless connection). In some instances, client augmented reality device 160 may be a headset-style augmented reality device (e.g., AR glasses) while in other instances, client augmented reality device 160 may be another type of augmented reality device (e.g., in-windshield heads-up display device) or the like.

Computing environment 100 also may include one or more networks, which may interconnect one or more of augmented reality experience computing platform 110, enterprise institution server infrastructure 120, enterprise center automation platform 130, enterprise center user device 140, client user device 150, and client augmented reality device 160. For example, computing environment 100 may include a private network 170 (which may, e.g., interconnect client augmented reality experience computing platform 110, enterprise institution server infrastructure 120, enterprise center automation platform 130, and enterprise center user device 140) and public network 180 (which may, e.g., interconnect client user device 150, client augmented reality device 160, and/or one or more other systems, public networks, sub-networks, and/or the like).

In one or more arrangements, enterprise center user device 140, client user device 150, client augmented reality device 160, and/or the other systems included in computing environment 100 may be any type of computing device capable of receiving a user interface, receiving input via the user interface, and communicating the received input to one or more other computing devices. For example, enterprise center user device 140, client user device 150, client augmented reality device 160, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of augmented reality experience computing platform 110, enterprise institution server infrastructure 120, enterprise center automation platform 130, enterprise center user device 140, client user device 150, and client augmented reality device 160 may, in some instances, be special-purpose computing devices configured to perform specific functions.

Referring to FIG. 1B, augmented reality experience computing platform 110 may include one or more processors 111, memory 112, and communication interface 113. A data bus may interconnect processor 111, memory 112, and communication interface 113. Communication interface 113 may be a network interface configured to support communication between augmented reality experience computing platform 110 and one or more networks (e.g., network 170, network 180, or the like). Memory 112 may include one or more program modules having instructions that when executed by processor 111 cause augmented reality experience computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of augmented reality experience computing platform 110 and/or by different computing devices that may form and/or otherwise make up augmented reality experience computing platform 110. For example, memory 112 may have, store, and/or include an augmented reality experience module 112a and an augmented reality experience database 112b. Augmented reality experience module 112a may have instructions that direct and/or cause augmented reality experience computing platform 110 to provide augmented reality user interfaces and control automated systems based on user activity information and pre-staging information, as discussed in greater detail below. Augmented reality experience database 112b may store information used by augmented reality experience module 112a and/or augmented reality experience computing platform 110 in providing augmented reality user interfaces and controlling automated systems based on user activity information and pre-staging information and/or in performing other functions.

Figure 2B:
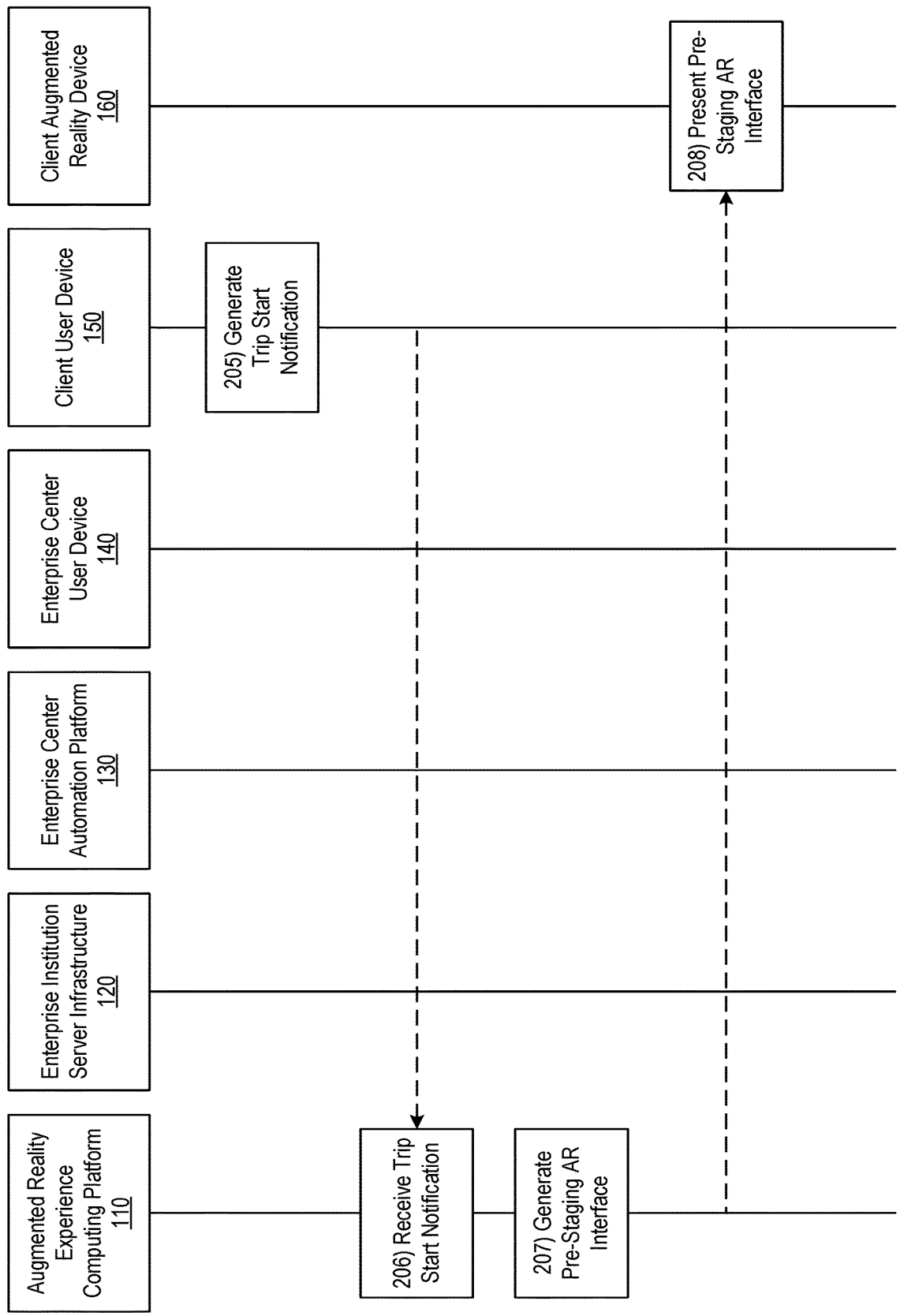

FIGS. 2A-2F depict an illustrative event sequence for providing augmented reality user interfaces and controlling automated systems based on user activity information and pre-staging information in accordance with one or more example embodiments. Referring to FIG. 2A, at step 201, enterprise institution server infrastructure 120 may receive user activity information. For example, at step 201, enterprise institution server infrastructure 120 may receive user activity information from a plurality of data sources associated with an enterprise that is using and/or operating augmented reality experience computing platform 110 and enterprise institution server infrastructure 120, and the user activity information may include data identifying one or more visits (e.g., to one or more enterprise centers, such as one or more banking centers), transactions (e.g., involving accounts internal to the enterprise and/or external with other parties, such as merchants), and/or other events involving one or more specific users (who may, e.g., be customers of the enterprise, such as clients of a financial institution operating augmented reality experience computing platform 110 and enterprise institution server infrastructure 120).

At step 202, enterprise institution server infrastructure 120 may update user profile information based on the user activity information. For example, at step 202, enterprise institution server infrastructure 120 may generate and/or modify one or more user profiles corresponding to the one or more specific users for which user activity information was received, so as to reflect new and/or modified information (which may, e.g., correspond to new and/or recent visits, transactions, and/or other events associated with new and/or existing users). At step 203, enterprise institution server infrastructure 120 may generate an artificial-intelligence-based notification and send the notification to augmented reality experience computing platform 110. For example, an artificial-intelligence engine may reside and/or execute on enterprise institution server infrastructure 120 and may predict future visits, transactions, and/or other events for one or more specific users based on the user activity information received by enterprise institution server infrastructure 120 and/or the user profile information maintained by enterprise institution server infrastructure 120. For instance, the artificial-intelligence engine residing and/or executing on enterprise institution server infrastructure 120 may predict (e.g., based on user activity information and/or user profile information) that a specific user might need to make a cash withdrawal on a particular day at a particular location for a recurring event or a one-time event. Enterprise institution server infrastructure 120 may send this notification to augmented reality experience computing platform 110 so that it may be presented to the user (e.g., to remind the user before a trip starts, such as when the user is about to leave their home or their workplace) to assist the user in pre-staging a cash withdrawal transaction (or another transaction or event) as illustrated in examples described below.

At step 204, augmented reality experience computing platform 110 may receive the notification from enterprise institution server infrastructure 120. In addition, augmented reality experience computing platform 110 may determine that the notification is intended for and/or directed to a user who is linked to and/or otherwise associated with client user device 150 and/or client augmented reality device 160, and augmented reality experience computing platform 110 subsequently may send the notification to client user device 150 (which may, e.g., cause client user device 150 to display and/or otherwise present the notification received from enterprise institution server infrastructure 120). For example, at step 204, augmented reality experience computing platform 110 may receive, via the communication interface (e.g., communication interface 113), from enterprise institution server infrastructure (e.g., enterprise institution server infrastructure 120), a notification generated by an artificial-intelligence engine executing on the enterprise institution server infrastructure (e.g., enterprise institution server infrastructure 120), and the notification may identify at least one predicted event for the user of the client user device (e.g., client user device 150). Then, augmented reality experience computing platform 110 may send, via the communication interface (e.g., communication interface 113), to the client user device (e.g., client user device 150), the notification received from the enterprise institution server infrastructure (e.g., enterprise institution server infrastructure 120).

Referring to FIG. 2B, at step 205, client user device 150 may generate a trip start notification and may send the notification to augmented reality experience computing platform 110. For example, at step 205, client user device 150 may generate and send to augmented reality experience computing platform 110 a trip start notification indicating that the user of client user device 150 is starting and/or has started a trip to an enterprise center (which may, e.g., be a banking center, automated teller machine, or another location associated with a financial institution operating augmented reality experience computing platform 110 and/or enterprise institution server infrastructure 120). At step 206, augmented reality experience computing platform 110 may receive the trip start notification. For example, at step 206, augmented reality experience computing platform 110 may receive, via the communication interface (e.g., communication interface 113), from a client user device (e.g., client user device 150), a trip start notification indicating that a user of the client user device (e.g., client user device 150) is initiating a trip to an enterprise center. In some instances, augmented reality experience computing platform 110 may receive trip start notification as a result of client user device 150 detecting that the user has entered a personal vehicle, a shared or rental vehicle, or an autonomous vehicle. In instances in which client user device 150 sends the trip start notification based on detecting that the user has entered a shared vehicle or an autonomous vehicle, the user may input the enterprise center location as a stop or destination of their ride, and this data entry may trigger augmented reality experience computing platform 110 and/or enterprise institution server infrastructure 120 to cause a pre-staging menu to be presented on client user device 150 (e.g., in the user's mobile banking application). Additionally or alternatively, this data entry may encoded in the notification, such that the notification includes the user's estimated time of arrival at the enterprise center (which may, e.g., enable transaction items to be ready at the enterprise center when the user arrives).

In some embodiments, receiving the trip start notification from the client user device may include receiving information indicating an estimated time of arrival determined by an autonomous vehicle being used by the user of the client user device to travel to the enterprise center. For example, in receiving the trip start notification from the client user device (e.g., client user device 150) at step 206, augmented reality experience computing platform 110 may receive information indicating an estimated time of arrival determined by an autonomous vehicle being used by the user of the client user device (e.g., client user device 150) to travel to the enterprise center. For instance, the user may have entered the enterprise center location as a stop or destination of their ride in the autonomous vehicle, which may determine the estimated time of arrival and embed this information in the notification.

In some embodiments, receiving the trip start notification from the client user device may include receiving information indicating an estimated time of arrival determined by a ride sharing application associated with a ride sharing service being used by the user of the client user device to travel to the enterprise center. For example, in receiving the trip start notification from the client user device (e.g., client user device 150) at step 206, augmented reality experience computing platform 110 may receive information indicating an estimated time of arrival determined by a ride sharing application associated with a ride sharing service being used by the user of the client user device (e.g., client user device 150) to travel to the enterprise center. For instance, the user may have entered the enterprise center location as a stop or destination of their ride in the ride sharing application, which may determine the estimated time of arrival and embed this information in the notification.

At step 207, augmented reality experience computing platform 110 may generate a pre-staging interface that is optimized for presentation on an augmented reality device, and may send this pre-staging interface to client augmented reality device 160 (which may, e.g., cause client augmented reality device 160 to display and/or otherwise present the interface to the user of client augmented reality device 160 and client user device 150). For example, at step 207, in response to receiving the trip start notification from the client user device (e.g., client user device 150), augmented reality experience computing platform 110 may generate a pre-staging augmented reality user interface for a client augmented reality device (e.g., client augmented reality device 160) linked to the client user device (e.g., client user device 150). Subsequently, augmented reality experience computing platform 110 may send, via the communication interface (e.g., communication interface 113), to the client augmented reality device (e.g., client augmented reality device 160) linked to the client user device (e.g., client user device 150), the pre-staging augmented reality user interface generated for the client augmented reality device (e.g., client augmented reality device 160) linked to the client user device (e.g., client user device 150). In addition, by sending the pre-staging augmented reality user interface generated for the client augmented reality device (e.g., client augmented reality device 160) linked to the client user device (e.g., client user device 150), augmented reality experience computing platform 110 may cause the client augmented reality device (e.g., client augmented reality device 160) linked to the client user device (e.g., client user device 150) to display the pre-staging augmented reality user interface and prompt the user of the client user device (e.g., client user device 150) to provide pre-staging input.

Figure 3:
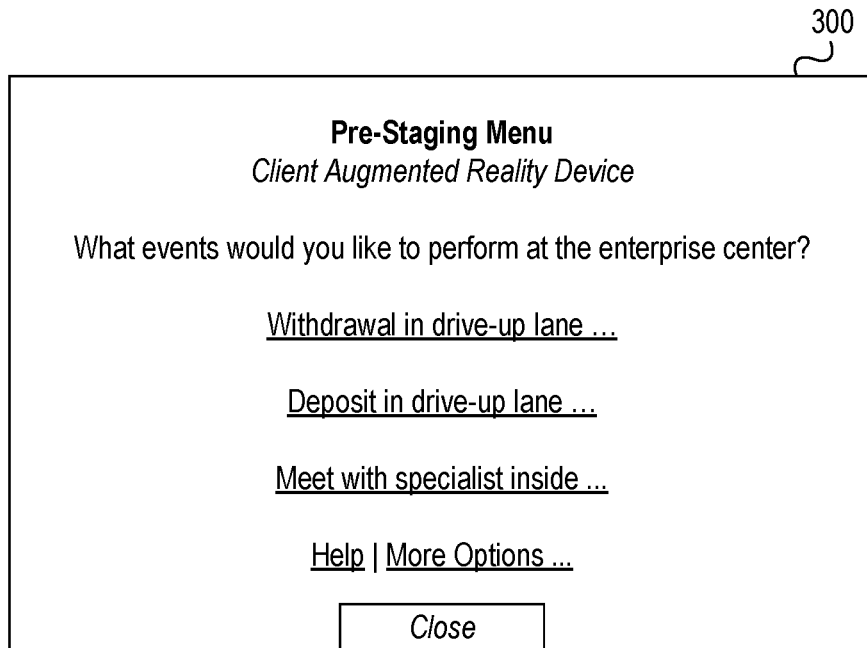
FIGS. 3 and 4 depict example graphical user interfaces for providing augmented reality user interfaces and controlling automated systems based on user activity information and pre-staging information in accordance with one or more example embodiments.

For example, by sending the pre-staging augmented reality user interface generated for the client augmented reality device (e.g., client augmented reality device 160) linked to the client user device (e.g., client user device 150), augmented reality experience computing platform 110 may cause the client augmented reality device (e.g., client augmented reality device 160) linked to the client user device (e.g., client user device 150) to display and/or otherwise present a graphical user interface similar to graphical user interface 300, which is illustrated in FIG. 3. As seen in FIG. 3, graphical user interface 300 may include a pre-staging menu that may include one or more user-selectable options that allow the user of client augmented reality device 160 to pre-stage one or more events at an enterprise center (e.g., "Withdrawal in drive-up lane; Deposit in drive-up lane; Meet with specialist inside"). In addition, graphical user interface 300 may be displayed as an overlay on real-world elements that may be visible through one or more transparent and/or translucent display elements of client augmented reality device 160. For instance, graphical user interface 300 may be displayed as an overlay on a headset-style augmented reality device (e.g., AR glasses), an in-windshield heads-up display device, or any other type of AR device. In some instances, augmented reality experience computing platform 110 may send the pre-staging interface directly to client augmented reality device 160 (e.g., via a connection established between augmented reality experience computing platform 110 and client augmented reality device 160), while in other instances, augmented reality experience computing platform 110 may send the pre-staging interface indirectly to client augmented reality device 160 (e.g., by sending the pre-staging interface to client user device 150, via a connection established between augmented reality experience computing platform 110 and client user device 150).

In some embodiments, sending the pre-staging augmented reality user interface to the client augmented reality device linked to the client user device may include sending the pre-staging augmented reality user interface to an augmented reality headset linked to the client user device. For example, in sending the pre-staging augmented reality user interface to the client augmented reality device (e.g., client augmented reality device 160) linked to the client user device (e.g., client user device 150) at step 207, augmented reality experience computing platform 110 may send the pre-staging augmented reality user interface to an augmented reality headset linked to the client user device (e.g., client user device 150). For instance, client augmented reality device 160 may be and/or include an augmented reality headset (e.g., AR glasses).

In some embodiments, sending the pre-staging augmented reality user interface to the client augmented reality device linked to the client user device may include sending the pre-staging augmented reality user interface to an augmented reality windshield display system linked to the client user device. For example, in sending the pre-staging augmented reality user interface to the client augmented reality device (e.g., client augmented reality device 160) linked to the client user device (e.g., client user device 150) at step 207, augmented reality experience computing platform 110 may send the pre-staging augmented reality user interface to an augmented reality windshield display system linked to the client user device (e.g., client user device 150). For instance, client augmented reality device 160 may be and/or include an in-windshield heads-up display device (e.g., of a car in which the user of client user device 150 is traveling to the enterprise center).

At step 208, client augmented reality device 160 may present the pre-staging augmented reality user interface. For example, at step 208, client augmented reality device 160 may display and/or otherwise present the pre-staging augmented reality user interface received from augmented reality experience computing platform 110 (e.g., by presenting one or more display elements of the pre-staging augmented reality user interface received from augmented reality experience computing platform 110 as an overlay on one or more real-world elements viewed by the user of client augmented reality device 160 using one or more transparent and/or translucent display portions of client augmented reality device 160).

Figure 2C:
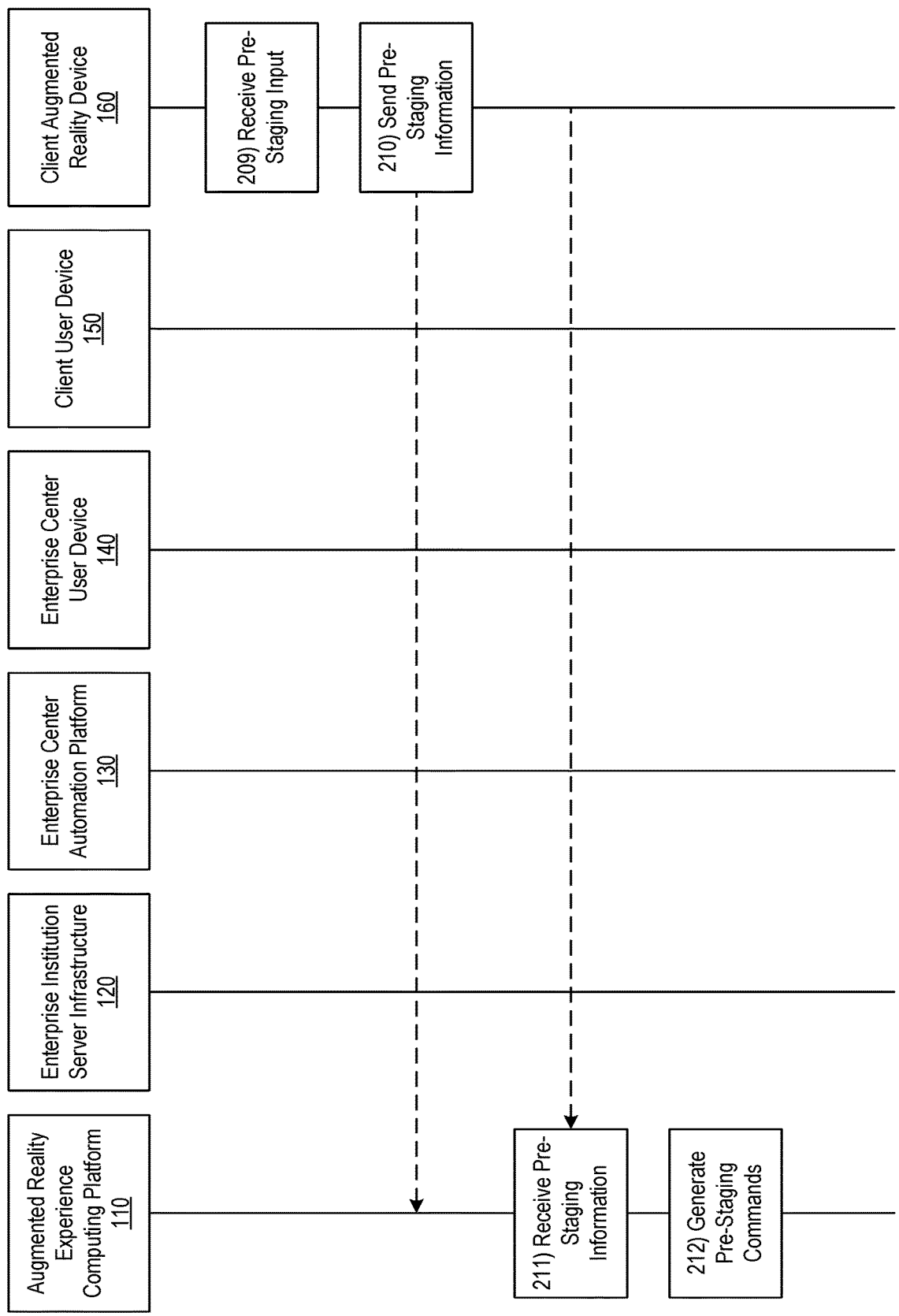

Referring to FIG. 2C, at step 209, client augmented reality device 160 may receive pre-staging input from the user of client augmented reality device 160. For instance, the user of client augmented reality device 160 may pre-stage and/or queue up one or more transactions and/or other events via the pre-staging augmented reality user interface received from augmented reality experience computing platform 110. For instance, before the user of client augmented reality device 160 arrives at the enterprise center (which may, e.g., be a banking center), the user of client augmented reality device 160 may provide input indicating a desire to withdraw a specific amount of funds (e.g., $200). In some instances, the user of client augmented reality device 160 may respond to prompt generated by augmented reality experience computing platform 110 and/or enterprise institution server infrastructure 120 prompting the user of client augmented reality device 160 as to whether they wish to withdraw a certain amount of funds based on predicted needs determined by the artificial intelligence engine that resides and/or executes on enterprise institution server infrastructure 120. As discussed above, augmented reality experience computing platform 110 may, in some instances, receive an expected time of arrival for the user of client augmented reality device 160 at the enterprise center, and in these instances, augmented reality experience computing platform 110 may interact with and/or control one or more other systems and/or devices at the enterprise center, such as enterprise center automation platform 130, so that any items requested by the user of client augmented reality device 160 in the pre-staging process are ready for the user of client augmented reality device 160 when they arrive at the enterprise center. For example, various customers deposits and/or withdrawals may be pre-loaded in a series of lockboxes and/or access-controlled slots that are secured and/or controlled by enterprise center automation platform 130, and augmented reality experience computing platform 110 may control enterprise center automation platform 130 to cause and/or command loading and/or access to these lockboxes and/or access-controlled slots based on input received in the pre-staging process and/or based on other information.

At step 210, client augmented reality device 160 may send pre-staging information to augmented reality experience computing platform 110. For example, at step 210, client augmented reality device 160 may send pre-staging information to augmented reality experience computing platform 110 that includes and/or is generated by client augmented reality device 160 based on the pre-staging input received by client augmented reality device 160 at step 209. At step 211, augmented reality experience computing platform 110 may receive the pre-staging information from client augmented reality device 160. For example, at step 211, augmented reality experience computing platform 110 may receive, via the communication interface (e.g., communication interface 113), from the client augmented reality device (e.g., client augmented reality device 160) linked to the client user device (e.g., client user device 150), pre-staging information identifying one or more events to be performed at the enterprise center when the user of the client user device (e.g., client user device 150) arrives at the enterprise center.

In some embodiments, receiving the pre-staging information identifying the one or more events to be performed at the enterprise center may include receiving information identifying a request to pick up at least one physical item at the enterprise center. For example, in receiving the pre-staging information identifying the one or more events to be performed at the enterprise center from client augmented reality device 160 at step 211, augmented reality experience computing platform 110 may receive information identifying a request to pick up at least one physical item at the enterprise center. For instance, augmented reality experience computing platform 110 may receive information identifying a request for a withdrawal at a banking center.

In some embodiments, receiving the pre-staging information identifying the one or more events to be performed at the enterprise center may include receiving information identifying a request to drop off at least one physical item at the enterprise center. For example, in receiving the pre-staging information identifying the one or more events to be performed at the enterprise center from client augmented reality device 160 at step 211, augmented reality experience computing platform 110 may receive information identifying a request to drop off at least one physical item at the enterprise center. For instance, augmented reality experience computing platform 110 may receive information identifying a request for a deposit at a banking center.

In some embodiments, receiving the pre-staging information identifying the one or more events to be performed at the enterprise center may include receiving information identifying a request for a specific encounter at the enterprise center. For example, in receiving the pre-staging information identifying the one or more events to be performed at the enterprise center from client augmented reality device 160 at step 211, augmented reality experience computing platform 110 may receive information identifying a request for a specific encounter at the enterprise center. For instance, augmented reality experience computing platform 110 may receive information identifying a request to meet with a specific representative of the enterprise (e.g., a financial advisor), make an appointment, or the like.

At step 212, augmented reality experience computing platform 110 may generate one or more pre-staging commands. For example, at step 212, augmented reality experience computing platform 110 may generate one or more pre-staging commands based on the pre-staging information identifying the one or more events to be performed at the enterprise center. For instance, augmented reality experience computing platform 110 may create and/or otherwise generate one or more instructions for one or more systems and/or devices at the enterprise center based on one or more event templates that are stored and/or maintained by augmented reality experience computing platform 110.

Figure 2D:
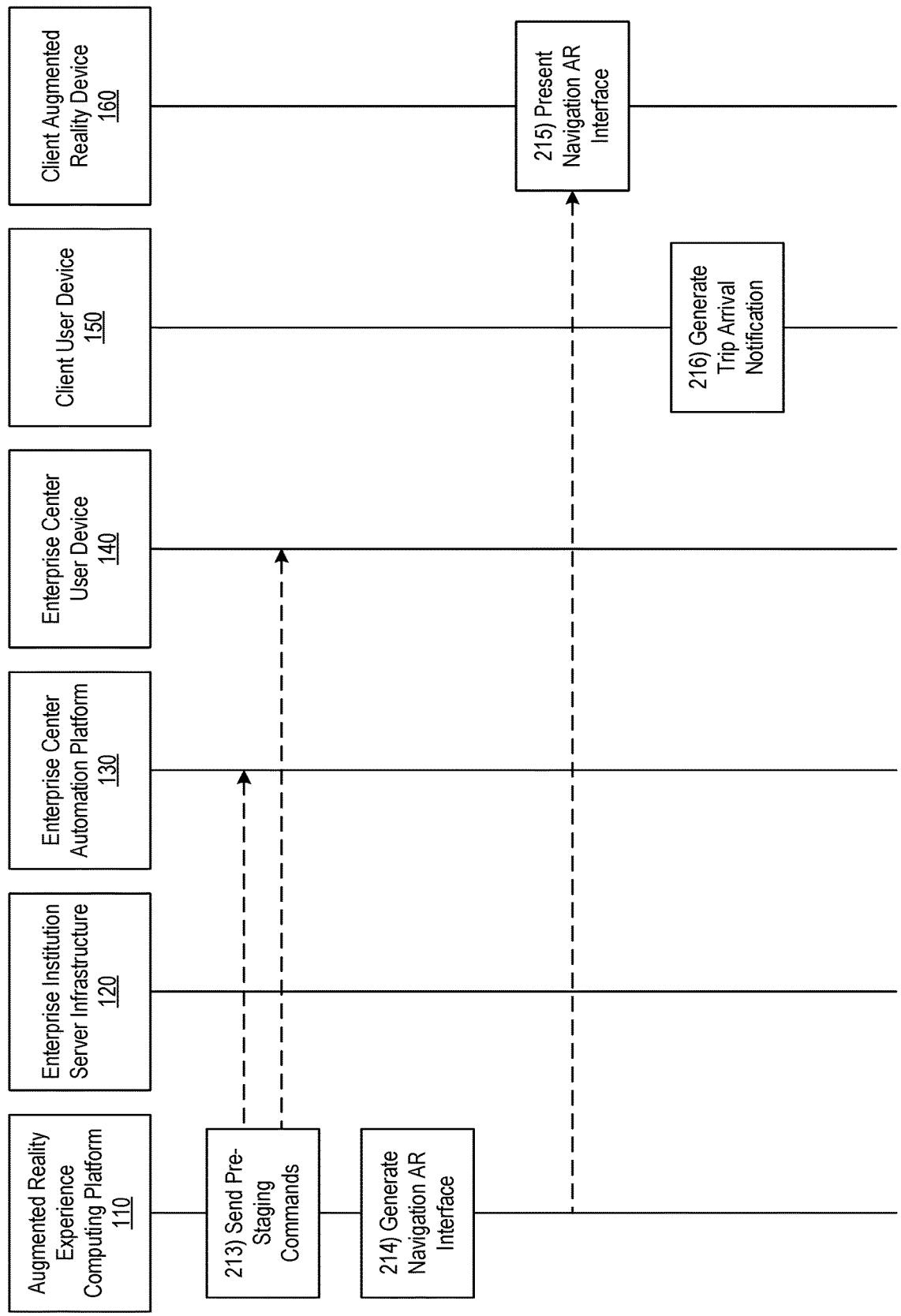

Referring to FIG. 2D, at step 213, augmented reality experience computing platform 110 may send the one or more pre-staging commands. For example, at step 213, augmented reality experience computing platform 110 may send, via the communication interface (e.g., communication interface 113), to one or more systems associated with the enterprise center (e.g., enterprise center automation platform 130, enterprise center user device 140), the one or more pre-staging commands generated based on the pre-staging information identifying the one or more events to be performed at the enterprise center. This may, for instance, cause enterprise center automation platform 130 and/or enterprise center user device 140 to initiate pre-loading and/or other preparation of one or more deposit and/or withdrawal items and/or otherwise prepare for one or more pre-staged events.

In some embodiments, sending the one or more pre-staging commands to the one or more systems associated with the enterprise center may include sending at least one command directing an enterprise center automation platform associated with the enterprise center to execute one or more automated physical item loading actions. For example, in sending the one or more pre-staging commands to the one or more systems associated with the enterprise center (e.g., enterprise center automation platform 130, enterprise center user device 140), augmented reality experience computing platform 110 may send at least one command directing an enterprise center automation platform (e.g., enterprise center automation platform 130) associated with the enterprise center to execute one or more automated physical item loading actions. For instance, augmented reality experience computing platform 110 may send at least one command directing enterprise center automation platform 130 to execute one or more automated physical item loading action to cause and/or control automated pre-loading and/or other preparation of one or more deposit items and/or withdrawal items.

In some embodiments, sending the one or more pre-staging commands to the one or more systems associated with the enterprise center may include sending at least one command directing an enterprise center user device to present a notification instructing a user of the enterprise center user device to perform one or more manual physical item loading actions. For example, in sending the one or more pre-staging commands to the one or more systems associated with the enterprise center (e.g., enterprise center automation platform 130, enterprise center user device 140), augmented reality experience computing platform 110 may send at least one command directing an enterprise center user device (e.g., enterprise center user device 140) to present a notification instructing a user of the enterprise center user device (e.g., enterprise center user device 140) to perform one or more manual physical item loading actions. For instance, augmented reality experience computing platform 110 may send at least one command directing enterprise center user device 140 to present a notification instructing an employee or affiliate at the enterprise center to perform manual pre-loading and/or other preparation of one or more deposit items and/or withdrawal items.

At step 214, augmented reality experience computing platform 110 may generate and send a navigation augmented reality user interface. For example, at step 214, after sending the one or more pre-staging commands to the one or more systems associated with the enterprise center (e.g., enterprise center automation platform 130, enterprise center user device 140), augmented reality experience computing platform 110 may generate a navigation augmented reality user interface for the client augmented reality device (e.g., client augmented reality device 160) linked to the client user device (e.g., client user device 150). In addition, augmented reality experience computing platform 110 may send, via the communication interface (e.g., communication interface 113), to the client augmented reality device (e.g., client augmented reality device 160) linked to the client user device (e.g., client user device 150), the navigation augmented reality user interface generated for the client augmented reality device (e.g., client augmented reality device 160) linked to the client user device (e.g., client user device 150). The navigation augmented reality user interface generated by augmented reality experience computing platform 110 for the client augmented reality device (e.g., client augmented reality device 160) linked to the client user device (e.g., client user device 150) may, for instance, include one or more navigation instructions directing the user of client augmented reality device 160 to the enterprise center and may be updated in real time by augmented reality experience computing platform 110 while the user of client augmented reality device 160 is traveling to the enterprise center, as discussed in greater detail below.

At step 215, client augmented reality device 160 may present the navigation augmented reality user interface. For example, at step 215, client augmented reality device 160 may display and/or otherwise present the navigation augmented reality user interface received from augmented reality experience computing platform 110 as an overlay on one or more real-world elements viewed by the user of client augmented reality device 160 using one or more transparent and/or translucent display portions of client augmented reality device 160. The navigation augmented reality user interface may be updated in real time (e.g., by client augmented reality device 160 and/or augmented reality experience computing platform 110), and augmented reality experience computing platform 110 and client augmented reality device 160 may exchange real-time updates of location information, updated user interface, and/or other information as the user of client augmented reality device 160 is traveling to the enterprise center. In some instances, the navigation augmented reality user interface may include directions to a banking center, automated teller machine, or other enterprise center. Additionally or alternatively, the navigation augmented reality user interface may include an arrow overlay highlighting other banking centers, automated teller machines, and/or other enterprise centers within a predetermined distance of the user of client augmented reality device 160 while the user of client augmented reality device 160 is traveling to the destination enterprise center. In some instances, as the user of client augmented reality device 160 approaches the enterprise center, the navigation augmented reality user interface generated by augmented reality experience computing platform 110 and presented by client augmented reality device 160 may include information identifying which lane of a drive-up service area (e.g., a drive-up banking area) the user of client augmented reality device 160 should enter. In some instances, augmented reality experience computing platform 110 may determine a specific lane of a plurality of available lanes to highlight using this interface overlay based on line length and/or expected wait time based on transactions and/or other events occurring involving other customers ahead in each line. Additionally or alternatively, augmented reality experience computing platform 110 may determine a specific lane of a plurality of available lanes to highlight using this interface overlay based on where the pre-staged items for the user of client augmented reality device 160 have been stored.

At step 216, client user device 150 may generate a trip arrival notification (which may, e.g., include information indicating that client user device 150 and/or the user of client user device 150 has arrived at the enterprise center). For instance, at step 216, client user device 150 may detect that client user device 150 and/or the user of client user device 150 has arrived at the enterprise center and may generate this trip arrival notification. In addition, client user device 150 may send the trip arrival notification to augmented reality experience computing platform 110.

Figure 2E:
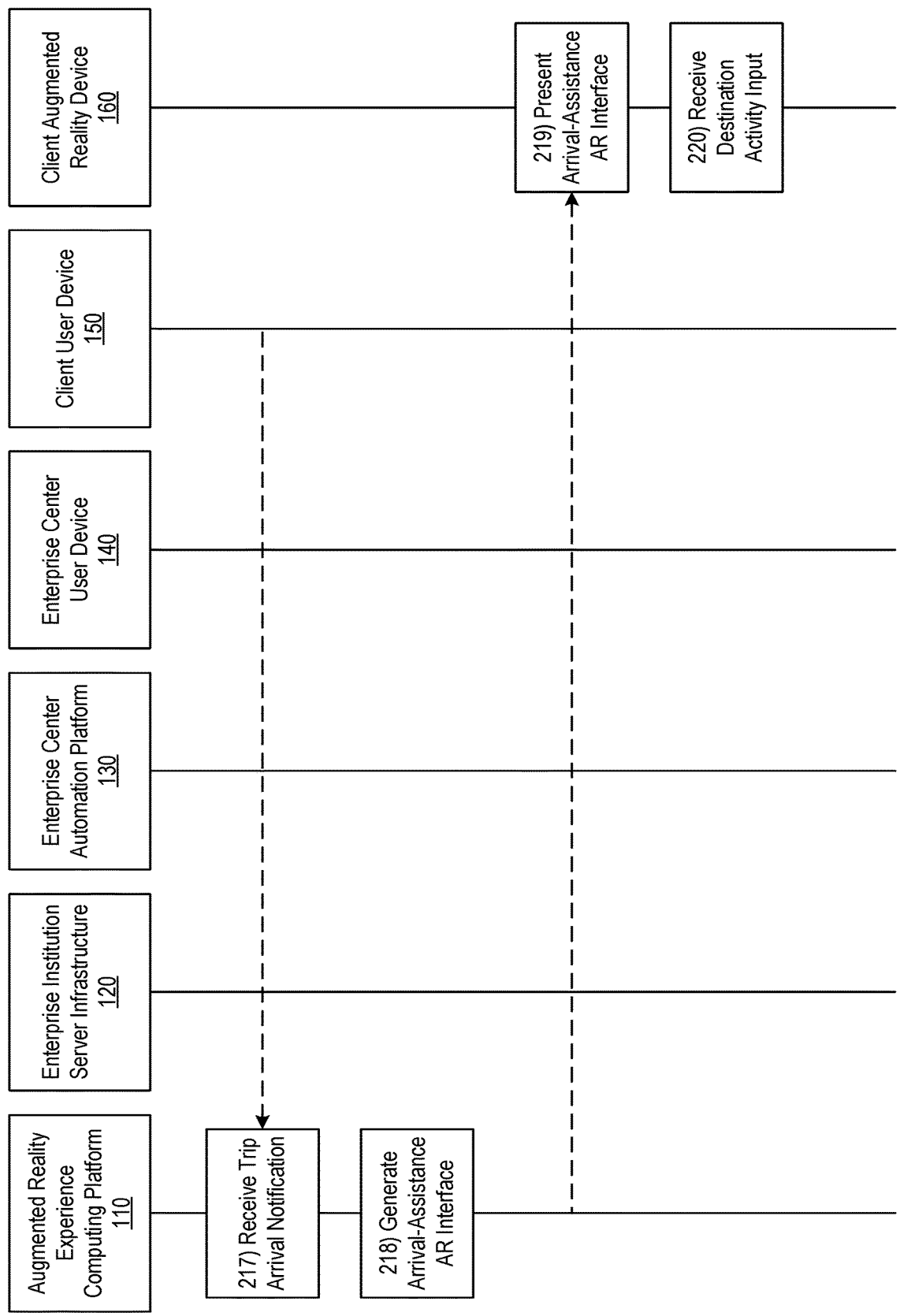

Referring to FIG. 2E, at step 217, augmented reality experience computing platform 110 may receive the trip arrival notification. For example, at step 217, augmented reality experience computing platform 110 may receive, via the communication interface (e.g., communication interface 113), from the client user device (e.g., client user device 150), a trip arrival notification indicating that the user of the client user device (e.g., client user device 150) has completed the trip to the enterprise center.

At step 218, augmented reality experience computing platform 110 may generate and send an arrival-assistance augmented reality user interface. For example, at step 218, in response to receiving the trip arrival notification from the client user device (e.g., client user device 150), augmented reality experience computing platform 110 may generate an arrival-assistance augmented reality user interface for the client augmented reality device (e.g., client augmented reality device 160) linked to the client user device (e.g., client user device 150). In addition, augmented reality experience computing platform 110 may send, via the communication interface (e.g., communication interface 113), to the client augmented reality device (e.g., client augmented reality device 160) linked to the client user device (e.g., client user device 150), the arrival-assistance augmented reality user interface generated for the client augmented reality device (e.g., client augmented reality device 160) linked to the client user device (e.g., client user device 150). Further, by sending the arrival-assistance augmented reality user interface generated for the client augmented reality device (e.g., client augmented reality device 160) linked to the client user device (e.g., client user device 150), augmented reality experience computing platform 110 may cause the client augmented reality device (e.g., client augmented reality device 160) linked to the client user device (e.g., client user device 150) to display the arrival-assistance augmented reality user interface and notify the user of the client user device (e.g., client user device 150) of one or more locations at the enterprise center to visit to complete the one or more events to be performed at the enterprise center. For instance, the arrival-assistance augmented reality user interface may include information notifying the user of client augmented reality device 160 where one or more requested withdrawal items are and/or other places to visit at the enterprise center, as discussed below.

Figure 4:
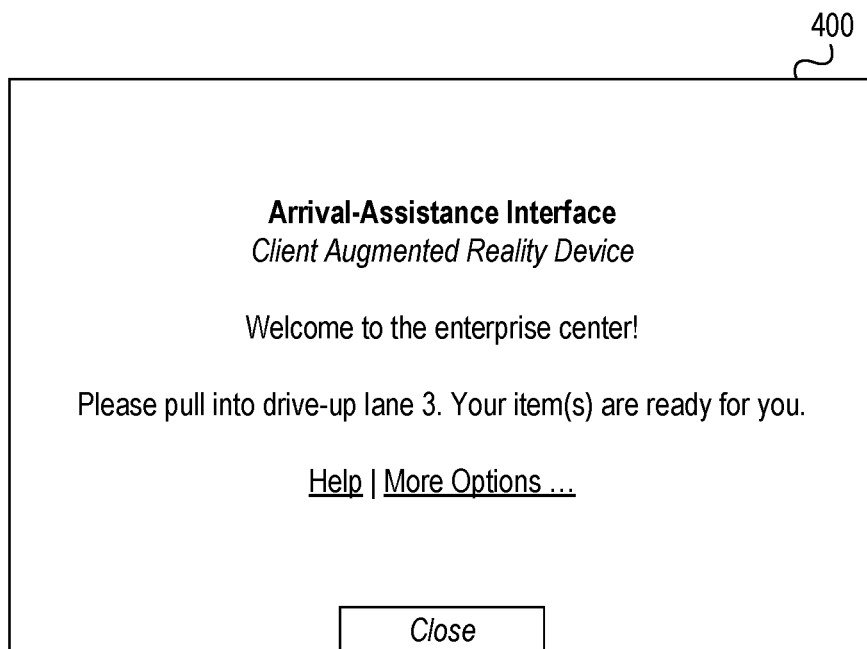

At step 219, client augmented reality device 160 may present the arrival-assistance augmented reality user interface. For example, at step 219, client augmented reality device 160 may display and/or otherwise present a graphical user interface similar to graphical user interface 400, which is illustrated in FIG. 4. As seen in FIG. 4, graphical user interface 400 may include information welcoming the user of client augmented reality device 160 to the enterprise center, information instructing the user to enter a particular drive-up lane or other specific area of the enterprise center, and/or one or more user-selectable controls allowing the user of client augmented reality device 160 to access other commands and options. In addition, graphical user interface 400 may be displayed as an overlay on real-world elements that may be visible through one or more transparent and/or translucent display elements of client augmented reality device 160. For instance, graphical user interface 400 may be displayed as an overlay on a headset-style augmented reality device (e.g., AR glasses), an in-windshield heads-up display device, or any other type of AR device.

In some instances, when the user arrives at the enterprise center, the user's AR device (e.g., client augmented reality device 160) and the presence of their registered vehicle may be treated as authentication factors by augmented reality experience computing platform 110, enterprise institution server infrastructure 120, and/or one or more other enterprise systems and/or devices. In addition, when the user arrives at the enterprise center, one or more pre-staged withdrawal items and/or other items may be prepared and ready for the user upon arrival based upon the user's pre-staged and/or queued event(s). For instance, as discussed above, one or more notifications may have been sent (e.g., by augmented reality experience computing platform 110) to one or more automated banking systems and/or one or more employee-operated devices to prepare and/or package funds and/or other items that address the user's requests and/or predicted needs. In addition, in instances where items may have been pre-loaded in a particular lockbox of a plurality of lockboxes or other area, the arrival-assistance augmented reality user interface may direct the user of client augmented reality device 160 to the right location to retrieve prepared and/or packaged items. In some instances, one or more notifications also may be generated by augmented reality experience computing platform 110 and/or presented by client augmented reality device 160, such as notifications instructing the user to visit other areas of the enterprise center because certain items could not be pre-staged (e.g., "Based on your questions and needs, we are not able to complete your request in the drive-up lane. Please park your vehicle and visit XXX inside the enterprise center.").

Figure 2F:
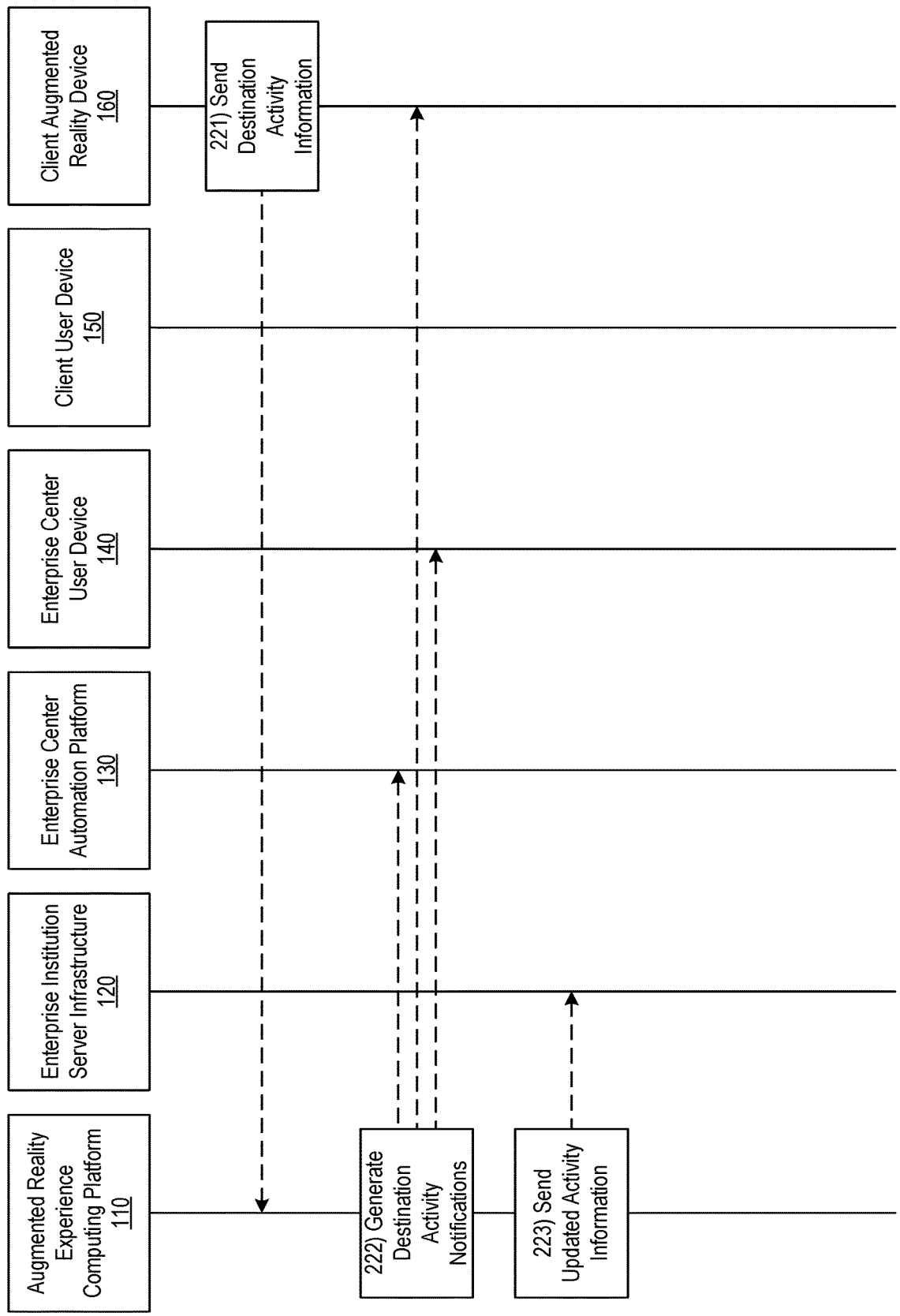

At step 220, client augmented reality device 160 may receive destination activity input (e.g., from the user of client augmented reality device 160). Referring to FIG. 2F, at step 221, client augmented reality device 160 may send destination activity information to augmented reality experience computing platform 110 that includes and/or is generated by client augmented reality device 160 based on the destination activity input received by client augmented reality device 160 at step 220. The destination activity information may, for instance, include local positioning information for client augmented reality device 160 at the enterprise center, information identifying requested and/or completed events at the enterprise center, and/or other information.

At step 222, augmented reality experience computing platform 110 may generate and send one or more destination activity notifications (e.g., based on the destination activity information received from client augmented reality device 160). For example, at step 222, augmented reality experience computing platform 110 may generate a destination activity notification for the client augmented reality device (e.g., client augmented reality device 160) linked to the client user device (e.g., client user device 150), and the destination activity notification generated for the client augmented reality device (e.g., client augmented reality device 160) linked to the client user device (e.g., client user device 150) may include information associated with the one or more events to be performed at the enterprise center. In addition, augmented reality experience computing platform 110 may send, via the communication interface (e.g., communication interface 113), to the client augmented reality device (e.g., client augmented reality device 160) linked to the client user device (e.g., client user device 150), the destination activity notification generated for the client augmented reality device (e.g., client augmented reality device 160) linked to the client user device (e.g., client user device 150). Additionally or alternatively, augmented reality experience computing platform 110 may send one or more destination activity notifications to other systems and/or devices associated with the enterprise center (e.g., enterprise center automation platform 130, enterprise center user device 140, or the like).

In some instances, when the user of client augmented reality device 160 is in a drive-up lane at the enterprise center, one or more destination activity notifications generated by augmented reality experience computing platform 110 may provide assistance information and/or overlays to help the user of client augmented reality device 160 complete a requested transaction or other event. For instance, such a notification may instruct the user to retrieve specific withdrawal items from a first component of a specific machine and/or insert deposit items at a second component of the machine, and/or may instruct the user to visit an interior portion of the enterprise center for additional assistance with a requested transaction or other event. In some instances, the augmented reality interfaces and notifications may enhance information security, as customer-specific information and/or other sensitive information might only displayed in the augmented reality interfaces presented on client augmented reality device 160 (e.g., while being redacted from and/or prevented from being included in automated teller machine interfaces or the like). Additionally or alternatively, the user of client augmented reality device 160 may provide input via their AR device rather than interacting with physical security devices at the enterprise center. For instance, the user of client augmented reality device 160 may enter a PIN number by interacting with a spatial keyboard presented by client augmented reality device 160 (e.g., instead of interacting with a physical keyboard of an automated teller machine at the enterprise center).

At step 223, augmented reality experience computing platform 110 may send updated user activity information to enterprise institution server infrastructure 120. For instance, augmented reality experience computing platform 110 may send updated user activity information to enterprise institution server infrastructure 120 that identifies one or more transactions and/or other events that were requested and/or completed by the user of client augmented reality device 160 while visiting the enterprise location. Any and/or all of this updated user activity information may be used by the artificial-intelligence engine residing and/or executing on enterprise institution server infrastructure 120 in predicting future needs of the user of client augmented reality device 160.

Figure 5:
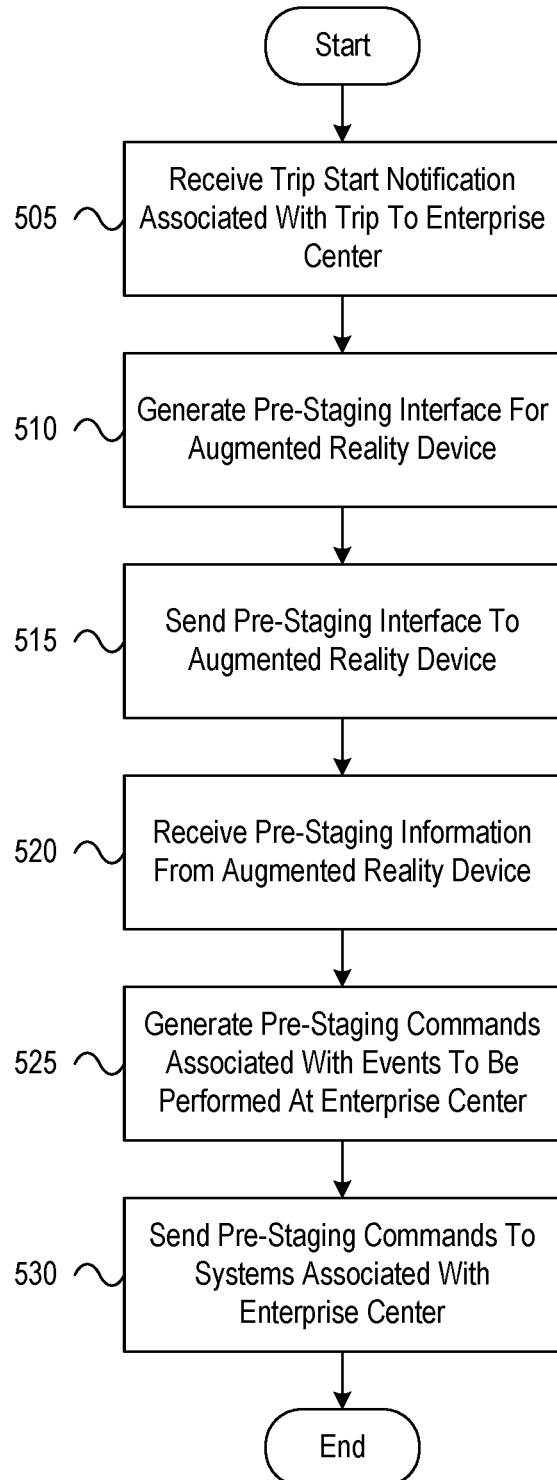
FIG. 5 depicts an illustrative method for providing augmented reality user interfaces and controlling automated systems based on user activity information and pre-staging information in accordance with one or more example embodiments.

FIG. 5 depicts an illustrative method for providing augmented reality user interfaces and controlling automated systems based on user activity information and pre-staging information in accordance with one or more example embodiments. Referring to FIG. 5, at step 505, a computing platform having at least one processor, a communication interface, and memory may receive, via the communication interface, from a client user device, a trip start notification indicating that a user of the client user device is initiating a trip to an enterprise center. At step 510, in response to receiving the trip start notification from the client user device, the computing platform may generate a pre-staging augmented reality user interface for a client augmented reality device linked to the client user device.

At step 515, the computing platform may send, via the communication interface, to the client augmented reality device linked to the client user device, the pre-staging augmented reality user interface generated for the client augmented reality device linked to the client user device. In addition, sending the pre-staging augmented reality user interface generated for the client augmented reality device linked to the client user device may cause the client augmented reality device linked to the client user device to display the pre-staging augmented reality user interface and prompt the user of the client user device to provide pre-staging input.

At step 520, the computing platform may receive, via the communication interface, from the client augmented reality device linked to the client user device, pre-staging information identifying one or more events to be performed at the enterprise center when the user of the client user device arrives at the enterprise center. At step 525, the computing platform may generate one or more pre-staging commands based on the pre-staging information identifying the one or more events to be performed at the enterprise center. At step 530, the computing platform may send, via the communication interface, to one or more systems associated with the enterprise center, the one or more pre-staging commands generated based on the pre-staging information identifying the one or more events to be performed at the enterprise center.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
at least one processor;
a communication interface communicatively coupled to the at least one processor; and
memory storing computer-readable instructions that, when executed by the at least one processor, cause the computing platform to:
receive, via the communication interface, from a client user device, a trip start notification indicating that a user of the client user device is initiating a trip to an enterprise center;
in response to receiving the trip start notification from the client user device, generate a pre-staging augmented reality user interface for a client augmented reality device linked to the client user device;
send, via the communication interface, to the client augmented reality device linked to the client user device, the pre-staging augmented reality user interface generated for the client augmented reality device linked to the client user device, wherein sending the pre-staging augmented reality user interface generated for the client augmented reality device linked to the client user device causes the client augmented reality device linked to the client user device to display the pre-staging augmented reality user interface and prompt the user of the client user device to provide pre-staging input;
receive, via the communication interface, from the client augmented reality device linked to the client user device, pre-staging information identifying one or more events to be performed at the enterprise center when the user of the client user device arrives at the enterprise center;
generate one or more pre-staging commands based on the pre-staging information identifying the one or more events to be performed at the enterprise center;
send, via the communication interface, to one or more systems associated with the enterprise center, the one or more pre-staging commands generated based on the pre-staging information identifying the one or more events to be performed at the enterprise center;
after sending the one or more pre-staging commands to the one or more systems associated with the enterprise center, generate a navigation augmented reality user interface for the client augmented reality device linked to the client user device; and
send, via the communication interface, to the client augmented reality device linked to the client user device, the navigation augmented reality user interface generated for the client augmented reality device linked to the client user device.

2. The computing platform of claim 1, wherein the memory stores additional computer-readable instructions that, when executed by the at least one processor, cause the computing platform to:
prior to receiving the trip start notification from the client user device:
receive, via the communication interface, from enterprise institution server infrastructure, a notification generated by an artificial-intelligence engine executing on the enterprise institution server infrastructure, the notification identifying at least one predicted event for the user of the client user device; and
send, via the communication interface, to the client user device, the notification received from the enterprise institution server infrastructure.

3. The computing platform of claim 1, wherein receiving the trip start notification from the client user device comprises receiving information indicating an estimated time of arrival determined by an autonomous vehicle being used by the user of the client user device to travel to the enterprise center.

4. The computing platform of claim 1, wherein receiving the trip start notification from the client user device comprises receiving information indicating an estimated time of arrival determined by a ride sharing application associated with a ride sharing service being used by the user of the client user device to travel to the enterprise center.

5. The computing platform of claim 1, wherein sending the pre-staging augmented reality user interface to the client augmented reality device linked to the client user device comprises sending the pre-staging augmented reality user interface to an augmented reality headset linked to the client user device.

6. The computing platform of claim 1, wherein sending the pre-staging augmented reality user interface to the client augmented reality device linked to the client user device comprises sending the pre-staging augmented reality user interface to an augmented reality windshield display system linked to the client user device.

7. The computing platform of claim 1, wherein receiving the pre-staging information identifying the one or more events to be performed at the enterprise center comprises receiving information identifying a request to pick up at least one physical item at the enterprise center.

8. The computing platform of claim 1, wherein receiving the pre-staging information identifying the one or more events to be performed at the enterprise center comprises receiving information identifying a request to drop off at least one physical item at the enterprise center.

9. The computing platform of claim 1, wherein receiving the pre-staging information identifying the one or more events to be performed at the enterprise center comprises receiving information identifying a request for a specific encounter at the enterprise center.

10. The computing platform of claim 1, wherein sending the one or more pre-staging commands to the one or more systems associated with the enterprise center comprises sending at least one command directing an enterprise center automation platform associated with the enterprise center to execute one or more automated physical item loading actions.

11. The computing platform of claim 1, wherein sending the one or more pre-staging commands to the one or more systems associated with the enterprise center comprises sending at least one command directing an enterprise center user device to present a notification instructing a user of the enterprise center user device to perform one or more manual physical item loading actions.

12. The computing platform of claim 1, wherein the memory stores additional computer-readable instructions that, when executed by the at least one processor, cause the computing platform to:
receive, via the communication interface, from the client user device, a trip arrival notification indicating that the user of the client user device has completed the trip to the enterprise center;
in response to receiving the trip arrival notification from the client user device, generate an arrival-assistance augmented reality user interface for the client augmented reality device linked to the client user device; and
send, via the communication interface, to the client augmented reality device linked to the client user device, the arrival-assistance augmented reality user interface generated for the client augmented reality device linked to the client user device, wherein sending the arrival-assistance augmented reality user interface generated for the client augmented reality device linked to the client user device causes the client augmented reality device linked to the client user device to display the arrival-assistance augmented reality user interface and notify the user of the client user device of one or more locations at the enterprise center to visit to complete the one or more events to be performed at the enterprise center.

13. The computing platform of claim 1, wherein the memory stores additional computer-readable instructions that, when executed by the at least one processor, cause the computing platform to:
generate a destination activity notification for the client augmented reality device linked to the client user device, the destination activity notification generated for the client augmented reality device linked to the client user device comprising information associated with the one or more events to be performed at the enterprise center; and
send, via the communication interface, to the client augmented reality device linked to the client user device, the destination activity notification generated for the client augmented reality device linked to the client user device.

14. A method, comprising:
at a computing platform comprising at least one processor, a communication interface, and memory:
receiving, by the at least one processor, via the communication interface, from a client user device, a trip start notification indicating that a user of the client user device is initiating a trip to an enterprise center;
in response to receiving the trip start notification from the client user device, generating, by the at least one processor, a pre-staging augmented reality user interface for a client augmented reality device linked to the client user device;
sending, by the at least one processor, via the communication interface, to the client augmented reality device linked to the client user device, the pre-staging augmented reality user interface generated for the client augmented reality device linked to the client user device, wherein sending the pre-staging augmented reality user interface generated for the client augmented reality device linked to the client user device causes the client augmented reality device linked to the client user device to display the pre-staging augmented reality user interface and prompt the user of the client user device to provide pre-staging input;
receiving, by the at least one processor, via the communication interface, from the client augmented reality device linked to the client user device, pre-staging information identifying one or more events to be performed at the enterprise center when the user of the client user device arrives at the enterprise center;
generating, by the at least one processor, one or more pre-staging commands based on the pre-staging information identifying the one or more events to be performed at the enterprise center;
sending, by the at least one processor, via the communication interface, to one or more systems associated with the enterprise center, the one or more pre-staging commands generated based on the pre-staging information identifying the one or more events to be performed at the enterprise center;
after sending the one or more pre-staging commands to the one or more systems associated with the enterprise center, generating, by the at least one processor, a navigation augmented reality user interface for the client augmented reality device linked to the client user device; and
sending, by the at least one processor, via the communication interface, to the client augmented reality device linked to the client user device, the navigation augmented reality user interface generated for the client augmented reality device linked to the client user device.

15. The method of claim 14, comprising:
prior to receiving the trip start notification from the client user device:
receiving, by the at least one processor, via the communication interface, from enterprise institution server infrastructure, a notification generated by an artificial-intelligence engine executing on the enterprise institution server infrastructure, the notification identifying at least one predicted event for the user of the client user device; and
sending, by the at least one processor, via the communication interface, to the client user device, the notification received from the enterprise institution server infrastructure.

16. The method of claim 14, wherein receiving the trip start notification from the client user device comprises receiving information indicating an estimated time of arrival determined by an autonomous vehicle being used by the user of the client user device to travel to the enterprise center.

17. The method of claim 14, wherein receiving the trip start notification from the client user device comprises receiving information indicating an estimated time of arrival determined by a ride sharing application associated with a ride sharing service being used by the user of the client user device to travel to the enterprise center.

18. The method of claim 14, wherein sending the pre-staging augmented reality user interface to the client augmented reality device linked to the client user device comprises sending the pre-staging augmented reality user interface to an augmented reality headset linked to the client user device.

19. The method of claim 14, comprising:
receiving, by the at least one processor, via the communication interface, from the client user device, a trip arrival notification indicating that the user of the client user device has completed the trip to the enterprise center;
in response to receiving the trip arrival notification from the client user device, generating, by the at least one processor, an arrival-assistance augmented reality user interface for the client augmented reality device linked to the client user device; and
sending, by the at least one processor, via the communication interface, to the client augmented reality device linked to the client user device, the arrival-assistance augmented reality user interface generated for the client augmented reality device linked to the client user device, wherein sending the arrival-assistance augmented reality user interface generated for the client augmented reality device linked to the client user device causes the client augmented reality device linked to the client user device to display the arrival-assistance augmented reality user interface and notify the user of the client user device of one or more locations at the enterprise center to visit to complete the one or more events to be performed at the enterprise center.

20. One or more non-transitory computer-readable media storing instructions that, when executed by a computing platform comprising at least one processor, a communication interface, and memory, cause the computing platform to:
receive, via the communication interface, from a client user device, a trip start notification indicating that a user of the client user device is initiating a trip to an enterprise center;
in response to receiving the trip start notification from the client user device, generate a pre-staging augmented reality user interface for a client augmented reality device linked to the client user device;
send, via the communication interface, to the client augmented reality device linked to the client user device, the pre-staging augmented reality user interface generated for the client augmented reality device linked to the client user device, wherein sending the pre-staging augmented reality user interface generated for the client augmented reality device linked to the client user device causes the client augmented reality device linked to the client user device to display the pre-staging augmented reality user interface and prompt the user of the client user device to provide pre-staging input;
receive, via the communication interface, from the client augmented reality device linked to the client user device, pre-staging information identifying one or more events to be performed at the enterprise center when the user of the client user device arrives at the enterprise center;
generate one or more pre-staging commands based on the pre-staging information identifying the one or more events to be performed at the enterprise center;
send, via the communication interface, to one or more systems associated with the enterprise center, the one or more pre-staging commands generated based on the pre-staging information identifying the one or more events to be performed at the enterprise center;
after sending the one or more pre-staging commands to the one or more systems associated with the enterprise center, generate a navigation augmented reality user interface for the client augmented reality device linked to the client user device; and
send, via the communication interface, to the client augmented reality device linked to the client user device, the navigation augmented reality user interface generated for the client augmented reality device linked to the client user device.

* * * * *